United States Patent [19]
Smith

[11] 3,816,836
[45] June 11, 1974

[54] SHIELDED INSTRUMENT PANEL FOR USE WITH A WINDSHIELD RADIO ANTENNA

[75] Inventor: Stanley E. Smith, Dayton, Ohio

[73] Assignee: General Motors Corporation, Detroit, Mich.

[22] Filed: June 11, 1973

[21] Appl. No.: 368,538

[52] U.S. Cl............... 343/713, 343/841, 174/35 R, 180/90, 264/45, 264/104
[51] Int. Cl. .................................. H01q 1/32
[58] Field of Search ......... 343/711, 712, 713, 841; 174/35 R; 180/90; 264/45, 104

[56] References Cited
UNITED STATES PATENTS
3,231,663  1/1966  Schwartz...................... 174/35 MS Primary Examiner—Eli Lieberman
Attorney, Agent, or Firm—Peter P. Kozak

[57] ABSTRACT

An instrument panel pad assembly located beneath the windshield opening of an automobile, including a metal shield in the form of a metal coating sprayed onto a non-conductive portion of a rigid insert within the instrument panel pad assembly and located to provide a radio frequency shield between the wiring of instrument panel and antenna of the vehicle.

5 Claims, 3 Drawing Figures

PATENTED JUN 11 1974 3,816,836

SHIELDED INSTRUMENT PANEL FOR USE WITH A WINDSHIELD RADIO ANTENNA

FIELD OF INVENTION

This invention relates to means for shielding an automobile radio antenna from interference produced by automobile electrical components emanating from the wiring located in the instrument panel.

DESCRIPTION OF PRIOR ART

The provision of an ideal antenna for an automobile has been a problem virtually since radios became a commonplace feature of the automobile. External antennas such as the common mast antenna have the obvious advantage of being fully exposed to the radio waves while being sufficiently removed from the radio frequency generated by the automobile electrical components to avoid interference therefrom. These antennas also have the obvious disadvantage of being subject to physical damage or loss due to collision with tree branches and the like, corrosion, vandalism and theft.

The design of interior antennas involves a major problem in that the metal vehicle roof and body function as an electromagnetic shield with regard to externally generated RF energy which impairs proper operation of such antennas. A form of interior antenna in successful use today is the windshield antenna wherein one or more thin conductors are supported upon or embedded within the windshield of the vehicle. Although this form of antenna avoids many of the problems associated with the mast antenna, it has disadvantages in that it is located close to RF energy sources in the instrument panel and therefor subject to interference from these sources.

SUMMARY OF THE INVENTION

It is an object of this invention to provide an efficient and economically constructed shield between the windshield antenna and the instrument panel of an automobile which forms an integral part of the instrument panel pad assembly of an automobile and which is located under the windshield so that radio frequency waves generated in the wiring in the instrument panel are blocked and prevented from reaching the antenna located in the windshield and interfering with desired radio operation.

It is a further object of this invention to provide an antenna shield which is made incident to the normal method for making the instrument panel pad whereby the cost of making and installing the shield is minimized.

These and other objects are accomplished by a method including the steps of providing a rigid electrically non-conductive insert or structural frame as is conventional in present day methods for making instrument panel pad assemblies, flame spraying a suitable metal over a suitable portion of the insert to provide a thin adherent metal layer on the insert adapted to be located between the antenna and the instrument panel or cluster of the automobile, providing an electrical connector means for grounding the sprayed metal layer, providing a flexible performed thermoplastic resin cover layer for the instrument panel pad and thereafter foaming a suitable synthetic resin between the insert and the skin layer so that a protective cushion is provided over the insert and the metal layer.

BRIEF DESCRIPTION OF THE DRAWINGS

Other objects and advantages of the invention will be apparent from the following detailed description of an embodiment of an invention reference being made to the accompanying drawings in which.

DESCRIPTION OF THE PREFERRED EMBODIMENT

A typical instrument panel assembly in use on automobiles today which will be hereinafter described in greater detail, consists of a rigid glass fiber-reinforced synthetic resin insert similar to that shown as FIG. 1 of the drawings which is covered with a suitable decoratively grained synthetic resin skin layer and has a suitable cushion or pad interposed between the insert and the skin layer. The skin layer serves as the top surface of the instrument panel pad which is located directly beneath the windshield opening of the automobile as shown generally in FIG. 2.

Figure 1:
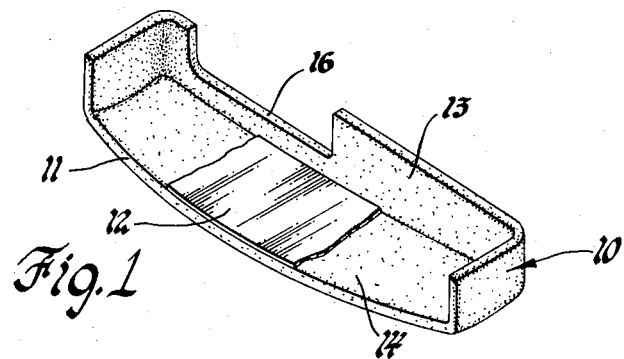
FIG. 1 is a perspective view of an inverted rigid electrically non-conductive insert for an instrument panel pad with a portion of the underside thereof being adherently flame spray coated with a suitable metal.

In general, the method of making the instrument panel pad includes the steps of molding or otherwise providing an insert similar to the insert 10 shown inverted in FIG. 1 having a top substantially horizontal portion 11 and depending portions 13 including an opening 16 receiving the instrument cluster on the driver's side of the automobile. The insert 10 is usually formed of a glass fiber-reinforced rigid synthetic resin. A flexible grained thermoplastic synthetic resin sheet is preformed which serves as the cover layer or outer skin of the instrument panel pad assembly. The skin layer is usually made by a vacuum forming method in which a sheet of the thermoplastic synthetic resin is heated to its softening temperature and then drawn by vacuum over a suitable mold. After cooling the preformed skin is placed into a female mold cavity which has the same contours of a preformed skin layer with the grained or outer surfaces placed in contact with the mold surface. The insert is then located within the mold in a fixed spaced relation to the skin layer. A foamable synthetic resin mixture such as one leading to the formation of polyurethane-foams is injected into the space between the skin layer and the insert. Usually the mold is preheated to accelerate the foaming reaction. After the resin mixture has reacted fully to fill the space between the insert and the skin layer, the resultant instrument panel pad is ready for installation in the vehicle body.

This invention involves flame spraying an adherent layer of molten metal 12 preferably on the underside 14 of the top portion 11 of the insert 10 in a suitable shield configuration and located on the insert so as to be in a position to shield the windshield antenna from the electrical wiring and instruments usually located beneath the instrument panel pad which may produce radio frequency radiation. A suitable electrical connection is provided whereby the sprayed layer may be electrically connected to the automobile body. Thereafter the insert 10 is associated with the skin and foam layer as above described to form the pad in the conventional manner.

Referring to FIG. 1, the insert 10 shown inverted from its normal position in the automobile is formed of a rigid electrically non-conductive material, preferably glass fiber-reinforced polystyrene or a glass fiber-reinforced styrene acrylonitrile copolymer. The shield is formed by first degreasing the surface 14 to be coated to insure that the sprayed metal layer adheres firmly thereto. This is accomplished by washing the surface 14 with a water and soap solution or by subjecting the surface to a torch flame whereby oil or like materials are burned off.

Figure 2:
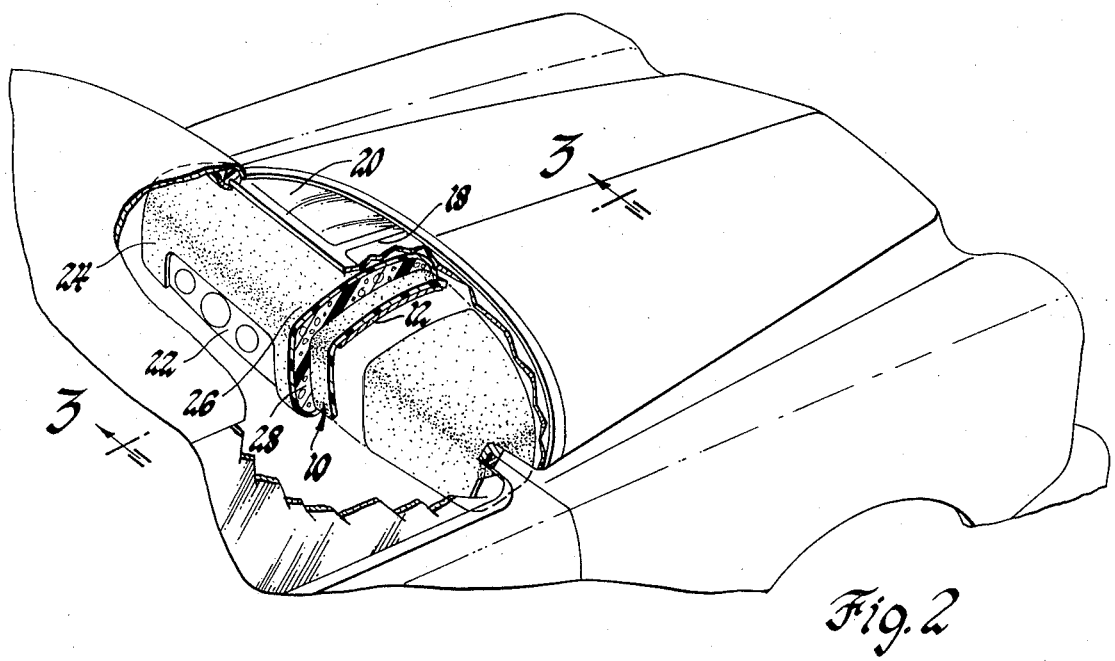
FIG. 2 is another perspective view with parts broken away of the instrument panel pad of this invention including the insert of FIG. 1 incorporated therein and located in place within an automobile body.

Next the layer 12 of zinc about 0.002 inch thick is sprayed over a predetermined portion of the underside 14. This is accomplished by means of a flame spraying gun such as the Metco System using an oxyacytelene wire gun. With the radio antenna 18 being located centrally of the windshield 20 as shown in FIG. 2 the shield 12 may be effectively applied to substantially the central one-third of the insert which when in position within the car body will effectively shield the antenna from the instrument panel cluster 22. It has been found that two hand passes with this gun spraying zinc forms a continuous layer about 2 mils in thickness with excellent adhesion to the synthetic resin substrate and with a satisfactory shielding effect. The ohmic resistance from end to end of the sprayed layer was found to be about 0.01 to 0.02 and equivalent to the shielding provided by 0.037 inch sheet steel. Satisfactory shielding with good adhesion to the plastic substrate may be obtained with a sprayed metal thickness of from about 0.002 to 0.005 inch. In general it is preferred to use the minimum metal thickness which will provide a continuous or coextensive sprayed coating on the insert. Metal thickness in excess of 0.005 inch have inferior adhesion. Zinc is the preferred shielding material because its relatively low melting temperature of 790°F makes relatively rapid spraying practical without damage to the plastic insert, the metal is non-toxic, adheres well to the plastic insert and has a low ohmic resistance which appears to favor good shielding performance.

Figure 3:
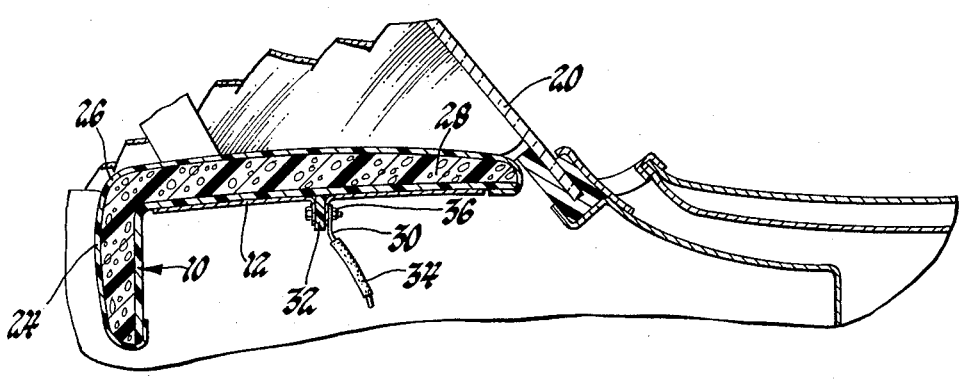
FIG. 3 is a cross-sectional view of the instrument panel pad taken along line 3—3 of FIG. 2.

The insert 10 is then incorporated into the instrument panel pad assembly 24 as above described and as shown in FIGS. 2 and 3. The instrument pad assembly 24 accordingly consists of the outer skin layer 26, the said insert 10 having the flame sprayed shield 12 and the flexible foam resin 28. The pad assembly 24 is located beneath the windshield 20 and the windshield antenna 18 so that radio frequency energy generated in the instrument cluster 22 and the wiring associated therewith are blocked by the shield 12.

The zinc layer or shield 12 is electrically connected to the car body by means of the connector device 30 shown in FIG. 3 which consists of a molded depending projection 32 on the insert 10, the zinc coating 12 flame sprayed thereon which is connected to an electrically conductive lead 34 by means of the bolt 36. The lead 34 is adapted for attachment to the vehicle body whereby the shield 12 is grounded.

Although zinc (790°F MP) is preferred for use as the shield metal, other low melting point metals have been found satisfactory. Using a suitably cleaned insert 10, a coextensive tin (450°F MP) layer was flame sprayed on the insert in two passes with good adhesion. The ohmic resistance was found to be 0.4 compared to 0.2 for zinc. A lead free babbit (450°F MP) layer was applied in a similar experiment with good adhesion and an ohmic resistance of 1.0. On the other hand in a similar experiment aluminum (1,200°F MP) applied by five passes of the spray gun produced a discontinuous and cracked coating with poor adhesion. Similarly a copper layer applied with 10 passes produced a cracked and discontinuous layer with poor adhesion. Lead is considered undesirable because of its toxicity.

As shown in FIGS. 2 and 3 the instrument panel pad is inserted directly under the vehicle windshield where the performance of the windshield antenna has been found to be substantially free of interference from radio frequency waves generated in the instrument panel area.

It is preferred to spray the shield 12 over the bottom side of the insert 10 because the shield may be readily connected to ground from this position. Application of the coating to the top is also satisfactory and may offer an advantage in mass production if the top surface horizontal portion 11 of the insert 10 is smooth.

The term "babbit" as used in the claims is intended to refer to alloys consisting essentially of 65 to 95 parts by weight tin, 8 to 12 parts antimony and about 1 part copper.

While the invention has been shown and described in terms of certain embodiments various modifications will be apparent to those skilled in the art.

It is claimed:

1. A method for making a radio frequency energy shield in combination with an instrument panel pad for an automobile, said panel pad having a generally horizontal portion adapted to underlie the windshield and overlie the instrument cluster comprising the steps of:

providing a rigid electrically non-conductive insert having a generally horizontal portion corresponding to said instrument panel horizontal portion and a preformed decorative electrically non-conductive cover portion for said panel,
   flame spraying on said insert horizontal portion a metal selected from the class consisting of zinc, tin and babbit to provide thereon an adherent metal layer about 0.002 to 0.005 inch thick bonded to said insert,
   locating said cover portion in a female mold,
   locating said insert within said female mold in spaced relation to said cover portion,
   injecting a foamable synthetic resin composition between said skin layer and said insert and foaming said composition to fill the space between said insert and said cover layer therewith.

2. The method of claim 1 wherein said metal is zinc.

3. A radio antenna shield in combination with an instrument panel pad for an automobile, said pad having a generally horizontal portion adapted to underlie the windshield and to overlie the instrument cluster, a rigid electrically non-conductive insert having a generally horizontal portion corresponding to said instrument panel horizontal portion and a preformed decorative electrically non-conductive cover portion,
   a continuous flame sprayed electrically conductive metal layer of a predetermined configuration coextensively bonded to at least a portion of said horizontal portion and located so that when the said pad is installed in an automobile said layer is interposed between the instrument cluster and the radio antenna carried by the windshield, said insert being disposed in spaced relation to said cover portion and a layer of foamed synthetic resin interposed between said insert and said cover layer and connector means for electrically connecting said layer to said automobile body.

4. A radio antenna shield in combination with an instrument panel pad for an automobile, said pad having a generally horizontal portion adapted to underlie the windshield and to overlie the instrument cluster, a rigid electrically non-conductive insert having a generally horizontal portion corresponding to said instrument panel horizontal portion and a preformed decorative electrically non-conductive cover portion, a continuous flame sprayed metal layer about 0.002 to 0.005 inch thick selected from the class consisting of zinc, tin and babbit of a predetermined elongated configuration coextensively bonded to at least a portion of said horizontal portion, said insert being disposed in spaced relation to said cover portion and a layer of foamed synthetic resin interposed between said insert and said cover layer and connector means electrically connected to said layer for connecting said layer to said automobile body.

5. The antenna of claim 4 wherein said metal layer is zinc.

* * * * *